No. 11,841. Reissued July 10, 1900.

E. I. PARSONS.

TRAVELING CABLE GRIP.

(Application filed June 5, 1900.)

Witnesses,
E. A. Brandau
J. H. Ennis

Inventor,
Edward I. Parsons
By Dewey & Strong Attys.

THE NORRIS PETERS CO., WASHINGTON, D. C.

UNITED STATES PATENT OFFICE.

EDWARD I. PARSONS, OF SAN FRANCISCO, CALIFORNIA.

TRAVELING-CABLE GRIP.

SPECIFICATION forming part of Reissued Letters Patent No. 11,841, dated July 10, 1900.

Original No. 642,255, dated January 30, 1900. Application for reissue filed June 5, 1900. Serial No. 19,197.

*To all whom it may concern:*

Be it known that I, EDWARD I. PARSONS, a citizen of the United States, residing in the city and county of San Francisco, State of California, have invented an Improvement in Traveling-Cable Grips; and I hereby declare the following to be a full, clear, and exact description of the same.

My invention relates to a gripping apparatus which is especially designed for use in conjunction with aerial traveling ropeways in which the load is suspended from trolleys traveling upon a stationary cable and moved by means of a grip connected with the trolley-frame and adapted to be closed upon a traveling cable.

My invention consists of a novel mechanism by which the grip is closed, said mechanism being actuated by gravitation, so as to grip the cable when the weight is suspended, and means for releasing it when it is desired to stop the movement of the load.

It also comprises details of construction, which will be more fully explained by reference to the accompanying drawings, in which—

Figure 1:
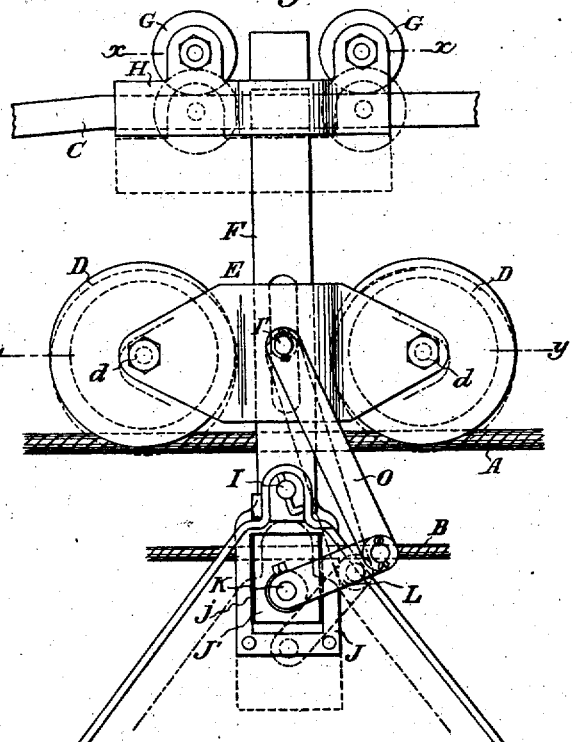
Figure 2:
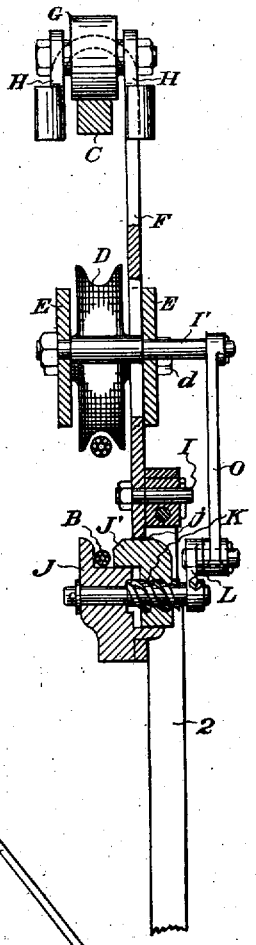
Figure 3:
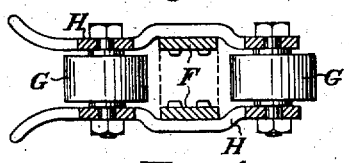
Figure 4:
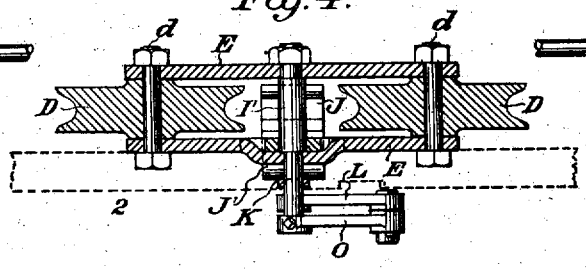

Figure 1 is a side elevation of the grip, the full lines showing the grip suspended from the short supporting-rail, the dotted lines when off the rail and on the supporting-cable. Fig. 2 is an end view of the same. Fig. 3 is a horizontal section on line *x x* of Fig. 1. Fig. 4 is a similar view on line *y y* of Fig. 1.

In the drawings, A is a fixed supporting track or cable, and B is a traveling cable through which motion is transmitted to move a load which is supported by trolleys from the fixed cable.

C represents a rail or support upon which the whole load is transferred whenever it is desired to disengage it from the traveling rope.

D D are the grooved trolleys, adapted to rest and travel upon the stationary rope. These trolleys are mounted upon axles or pins *d*, upon or with which they turn, and these pins are carried in a frame E, through which the bar or hanger F is guided and slidable.

The wheels or trolleys G are journaled upon a support H, which is fixed upon the upper end of the hanger F, and they are adapted to run upon the rails C when the weight of the load is to be supported free from the rope A. When these wheels G run off the short rail C, the whole weight of the load is supported upon the rope A. The load itself is suspended by any suitable hanger or carrier 2 from a pin I, which is here shown passing through the hanger F.

One of the gripping-jaws J is fixed by bolts or rivets, as shown, and the other jaw J′ is movable transversely with relation to the jaw J. This jaw J′ is guided and movable through a slot *j* in the lower end of the hanger F, as here shown, and through it is made a screw-thread of sharp pitch. A corresponding screw is turnable in this nut, and the screw-shank K has fixed upon its outer end a short rocker-arm L. O is a rod connecting the outer end of this rocker-arm with the shaft I′, so that when the weight is supported by cable A it acts to turn the rocker-arm L and the screw-shaft K, which being journaled in the fixed jaw J will act to advance the jaw J′ and cause it to grip the rope or cable passing between the jaws. This gripping force upon the cable continues as long as the weight is supported from the trolleys D; but whenever the rollers G run upon the stationary supporting-rail C the weight is transferred from the rope A to the rail C, and this allows the parts to move with relation to each other, so that the rocker-arm L is turned in the direction to reverse the movement of the screw-shaft K and retract the gripping-jaw J′ upon it until the grip is released from the traveling cable B, when the load will become stationary and be supported upon the rail C. As soon as the pulleys G move off the rail C the weight will be transferred through the trolleys D to the rope A, and this transfer again acts to turn the screw and cause the jaws J J′ to again grip the traveling rope or cable B, when the load will be moved in unison therewith.

Having thus described my invention, what I claim as new, and desire to secure by Letters Patent, is—

1. In a suspended rope or cable tramway, the combination with the framework and the supporting-trolleys, of a slidable hanger guided by said framework, a fixed gripping-jaw carried by said hanger, a movable jaw carrying a screw-threaded nut, a screw journaled and turnable through said nut, a rocker-arm connected with the screw-shaft and connections between said rocker-arm and the framework, and a traction-cable adapted to be locked between said jaws.

2. In a suspended rope or cable tramway, trolleys journaled in a framework adapted to travel upon the cable, a sliding body guided by said framework, a stationary jaw fixed to said sliding body, a jaw guided and movable transversely with relation to the stationary jaw, a screw-shaft journaled and turnable through the stationary jaw having a screw-threaded portion fitting corresponding threads in the movable jaw, a rocker-arm fixed to the screw-shaft, a rod or link connecting said rocker-arm with the framework, whereby the movement of the sliding body relative to the supporting-trolley acts to turn the screw, and close or separate the gripping-jaws.

3. The combination with a framework of the rolling mechanism of a carrier and a sliding body guided by said framework and supporting the trolley, of a transversely-movable and guided gripping-jaw having interior screw-threads, a correspondingly-threaded screw-shaft passing through said jaw and turnably journaled in suitable supports, a rocker-arm fixed to said screw-shaft and a link connecting said rocker-arm with the framework, and a stationary gripping-jaw with relation to which the movable jaw is advanced or retracted and a traction-cable adapted to be locked between said jaws or released therefrom by the movement of the gripping-jaw.

4. The combination with the framework and supporting-trolleys and a cable upon which they travel, of a transversely-movable screw-actuated gripping mechanism, a traction-cable to which the apparatus is locked by said gripping mechanism, other wheels or trolleys fixed to the upper end of a body slidable with relation to the supporting-trolley framework, and a rail upon which said wheels are supported to remove the weight from the main cable and allow the grips to automatically unclose.

5. The combination in a suspended cable or rope railway, of a main stationary cable, trolleys journaled in a framework and adapted to travel thereon, rails intermittently fixed above said cable, a hanger slidable and guided with relation to the main trolley-carrying framework, said hanger having wheels journaled thereon and adapted to travel upon the fixed rails, and raise the load from the main cable, a traveling cable situated below the main cable, a stationary and transversely-movable gripping-jaw between which the traveling cable is gripped, a screw turnable through the movable jaw, to advance it toward or retract it from the stationary jaw, a rocker-arm upon the end of the screw-shaft and a rod connecting the said rocker-arm with the framework whereby the jaws are closed to grip the cable when the load is carried upon the trolleys of the main cable, and released and separate when the load is carried upon the fixed upper rails.

6. The combination in a suspended rope or cable tramway, of a traveling or traction cable, a main supporting-cable situated above the traveling cable, rails fixed intermittently at stopping stations and above the main supporting-cable, a framework with trolley-wheels journaled therein adapted to travel upon the main cable, a hanger guided and slidable with relation to said framework having rollers journaled at the upper end adapted to be received upon the upper fixed rails and transfer the weight of the load thereto from the main supporting-cable, a stationary and movable gripping-jaw carried by the hanger, a screw-threaded shaft fitting corresponding threads in the movable jaw, a rocker-arm fixed to said screw-shaft and a connecting-rod between said rocker-arm and the framework whereby the screw is actuated to close the jaws upon the traveling cable when the weight is carried upon the main supporting-cable and to separate the jaws and to release the gripped rope when the weight is transferred to the fixed rails.

In witness whereof I have hereunto set my hand.

EDWARD I. PARSONS.

Witnesses:
ALFRED A. ENQUIST,
S. H. NOURSE.